United States Patent
Rimboym et al.

(10) Patent No.: US 12,264,785 B2
(45) Date of Patent: Apr. 1, 2025

(54) GAS CONTROL SYSTEM AND METHOD WITH BRACKETED DEADBAND

(71) Applicant: VRG Controls LLC, Lake Zurich, IL (US)

(72) Inventors: Vladimir Rimboym, Highland Park, IL (US); James M. Garvey, Glen Ellyn, IL (US)

(73) Assignee: VRG Controls LLC, Lake Zurich, IL (US)

( * ) Notice: Subject to any disclaimer, the term of this patent is extended or adjusted under 35 U.S.C. 154(b) by 392 days.

(21) Appl. No.: 17/805,152

(22) Filed: Jun. 2, 2022

(65) Prior Publication Data
US 2023/0392756 A1 Dec. 7, 2023

(51) Int. Cl.
*F17D 1/02* (2006.01)
*F17D 3/01* (2006.01)
(Continued)

(52) U.S. Cl.
CPC .................. *F17D 1/02* (2013.01); *F17D 3/01* (2013.01); *F17D 3/18* (2013.01); *G05D 7/0623* (2013.01)

(58) Field of Classification Search
CPC ........... G05D 7/0623; F17D 1/02; F17D 3/01; F17D 3/18
See application file for complete search history.

(56) References Cited

U.S. PATENT DOCUMENTS

| | | | |
|---|---|---|---|
| 2014/0150874 A1* | 6/2014 | Garvey | F16K 17/105 137/627.5 |
| 2017/0130903 A1* | 5/2017 | Deville | F16K 31/126 |

(Continued)

FOREIGN PATENT DOCUMENTS

| | | | | |
|---|---|---|---|---|
| WO | WO-9512788 A1 * | 5/1995 | | B08B 15/023 |

*Primary Examiner* — William M McCalister
(74) *Attorney, Agent, or Firm* — Bishop & Diehl Ltd.

(57) ABSTRACT

A control system having a primary run and a trim run, each run including an inlet coupled to a main gas supply line, a pneumatically actuated control valve positioned downstream of the inlet, a pneumatic pressure controller having variable deadband adjustment, and an outlet feeding into a gas supply line to the facility. The control valve of the primary run is preferably high-capacity, while the control valve of the trim run is low-capacity. Further, the system and method for controlling gas supply to the facility has a total flow capacity through the primary run and trim run to the facility being defined by $C_X$, which is the total flow capacity of the primary run ($C_P$) plus the total flow capacity of the trim run ($C_T$), and an actual gas flow to the facility being defined by $F_X$, which is the actual flow of the primary run ($F_P$) plus the actual flow of the trim run ($F_T$) and wherein $F_X$ is less than $C_X$, $C_T$ is less than $C_P$ and $F_X$ is either stable, increasing, or decreasing based on a demand from the facility.

17 Claims, 6 Drawing Sheets

(51) Int. Cl.
*F17D 3/18* (2006.01)
*G05D 7/06* (2006.01)

(56) References Cited

U.S. PATENT DOCUMENTS

| | | | |
|---|---|---|---|
| 2017/0329310 A1* | 11/2017 | Patwardhan | G05B 11/42 |
| 2020/0241577 A1* | 7/2020 | Fread | F24H 1/225 |
| 2021/0116045 A1* | 4/2021 | Garvey | F16K 17/105 |
| 2022/0146052 A1* | 5/2022 | Rimboym | F17D 3/01 |

* cited by examiner

GAS CONTROL SYSTEM AND METHOD WITH BRACKETED DEADBAND

TECHNICAL FIELD OF THE INVENTION

The present invention relates to natural gas control systems. More specifically, the invention relates to a gas line control system for a facility requiring precise control for fluctuating demand.

BACKGROUND OF THE INVENTION

The industrial sector and the electric power sector are the two greatest "users" of natural gas in the United States. As evidenced below, it would be a great understatement to say these two sectors rely on natural gas.

The industrial sector uses natural gas as a fuel for process heating, in combined heat and power systems, as a raw material (feedstock) to produce chemicals, fertilizer, and hydrogen, and as lease and plant fuel. The electric power sector uses natural gas to generate electricity and produce useful thermal output. In 2020, the industrial sector accounted for about 33% of total U.S. natural gas consumption, while the electric power sector accounted for an astounding 38% of total U.S. natural gas consumption. Combined, the two sectors account for over 70% of natural gas consumption in the U.S.

However, and more importantly, natural gas was the source of about 34% of the U.S. industrial sector's total energy consumption and the source of about 33% for the electric power sector's total consumption. That is, on average, power plants and other facilities within these two sectors rely on a consistent natural gas supply for about one third of energy needs.

Unfortunately, power plants and other industrial facilities supplied by natural gas are often the most difficult to control due to rapid fluctuations in flow demand; short downstream piping systems that react rapidly to changes in a process; demand by an end use facility to maintain extreme stability of the process; and a necessity to limit pressure fluctuations to the process. These facilities demand reliable and accurate control of incoming natural gas pressure by the upstream regulation equipment that controls the process. In some cases, properly selected control valves can provide accurate, stable, and reliable pressure control when applied correctly. However, conventional pilot-operated regulators and control valves paired with standard pneumatic pressure controller configurations are incapable of providing the tight pressure control range needed due to inherent design attributes.

Power plants and facilities can frequently transition between low-flow volume demand and high-flow volume demand causing over and under pressure problems in gas lines. Over pressure and under pressure situations are undesirable and can be catastrophic for operations of the facilities. Accordingly, a gas supply control system is needed which is able to control flow reliably and precisely during rapidly changing facility demand.

Until the invention of the present application, these and other problems in the prior art went either unnoticed or unsolved by those skilled in the art. The present invention provides a system and associated method which performs precise control functions with the associated gas line infrastructure without sacrificing durability and reliability.

SUMMARY OF THE INVENTION

There is disclosed herein an improved gas supply control system and gas supply control method for a facility which avoids the disadvantages of prior systems while affording additional structural and operating advantages.

Generally speaking, the disclosed gas supply control system comprises a primary run and a trim run, each run comprising an inlet branching from a main gas supply line, a pneumatically actuated control valve positioned downstream of the inlet, a pneumatic pressure controller having variable deadband adjustment, and an outlet feeding into a gas supply line to the facility. The control valve of the primary run is preferably high-capacity, while the control valve of the trim run is low-capacity.

In preferred embodiments, the variable deadband adjustment of the primary pneumatic pressure controller is set at a higher percentage of the target pressure than the variable deadband adjustment of the trim pneumatic pressure controller. Further, the total flow capacity through the primary run and trim run to the facility is defined by $X_C$, which is the total flow capacity of the primary run ($P_C$) plus the total flow capacity of the trim run ($T_C$), and an actual gas flow to the facility is defined by $X_F$, which is the actual flow of the primary run ($P_F$) plus the actual flow of the trim run ($T_F$) and wherein $X_F$ is less than $X_C$, $T_C$ is less than $P_C$ and $X_F$ is either stable, increasing, or decreasing based on a demand from the facility.

Further, in such preferred embodiments, the control system operates to supply gas to the facility at $X_F=T_F$ when $X_F$ is less than or equal to $T_C$, at $X_F=P_F+T_C$ when $X_F$ is increasing and greater than $T_C$, at $X_F=P_F+T_F$ when $X_F$ is stable and greater than $T_C$, and at $X_F=P_F$ when $X_F$ is decreasing and greater than $T_C$.

In specific embodiments, over-pressure monitor control valves may be layered into both the primary run and trim run of the system for added control.

Methods for controlling gas supply to a facility through a gas supply line having a primary run and a trim run, wherein total flow capacity through the primary run and trim run to the facility is defined by $C_X$, which is the total flow capacity of the primary run ($C_P$) plus the total flow capacity of the trim run ($C_T$), and an actual gas flow to the facility is defined by $F_X$, which is the actual flow of the primary run ($F_P$) plus the actual flow of the trim run ($F_T$) and wherein $F_X$ is less than $C_X$, $C_T$ is less than $C_P$ and $F_X$ is either stable, increasing, or decreasing based on a demand from the facility, are also described.

Specific embodiments of the method comprise supplying gas to the facility wherein $F_X=F_T$ when $F_X$ is less than or equal to $C_T$, supplying gas to the facility wherein $F_X=F_P+C_T$ when $F_X$ is increasing and greater than $C_T$, supplying gas to the facility wherein $F_X=F_P+F_T$ when $F_X$ is stable and greater than $C_T$, and supplying gas to the facility wherein $F_X=F_P$ when $F_X$ is decreasing and greater than $C_T$.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
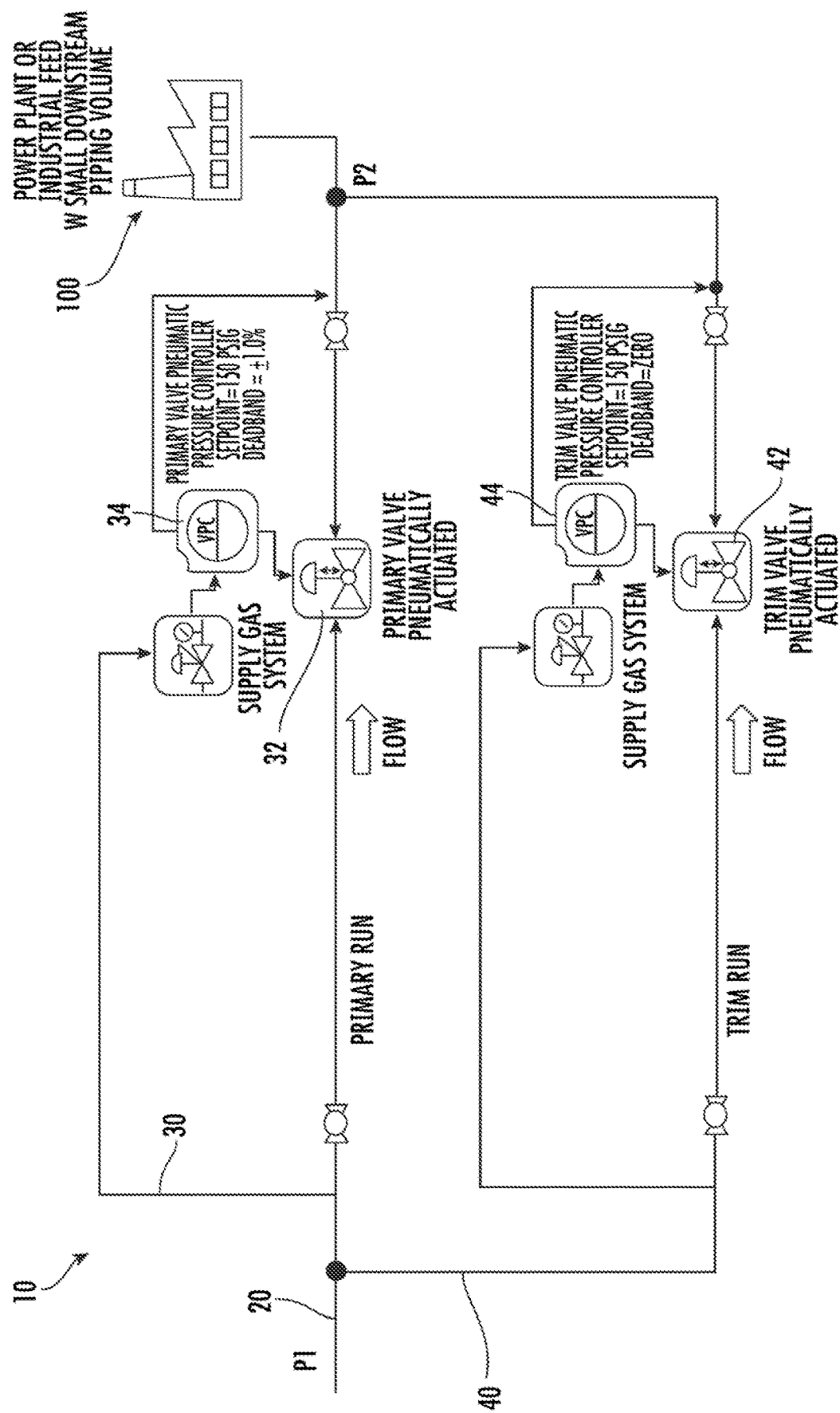
FIG. 1 is a schematic illustrating an embodiment of the disclosed system using linear control valves for controlling gas flow to a facility.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-4, there is illustrated an embodiment of the bracketed deadband control system, generally designated by the numeral 10. The particular illustrated control system 10 is for a gas supply to a facility. In fact, while the embodiment illustrated is directed to use at a power plant, it should be understood that the principles of the invention can be more broadly applied to other facilities which use a substantial amount of natural gas for operations.

As can be seen in FIG. 1, the control system 10 is comprised of a main gas supply line 20 having a gas flow from an upstream pressure (P1) to a downstream pressure (P2) where it enters a facility 100. The main gas supply line 20 includes a primary run 30 and a trim run 40, each positioned between P1 and P2. The primary run 30 includes a pneumatically actuated linear control valve 32 and a pneumatic pressure controller 34 having a variable deadband adjustment. Similarly, the trim run 40 includes a pneumatically actuated linear control valve 42 and a pneumatic pressure controller 44 having a variable deadband adjustment.

Figure 2:
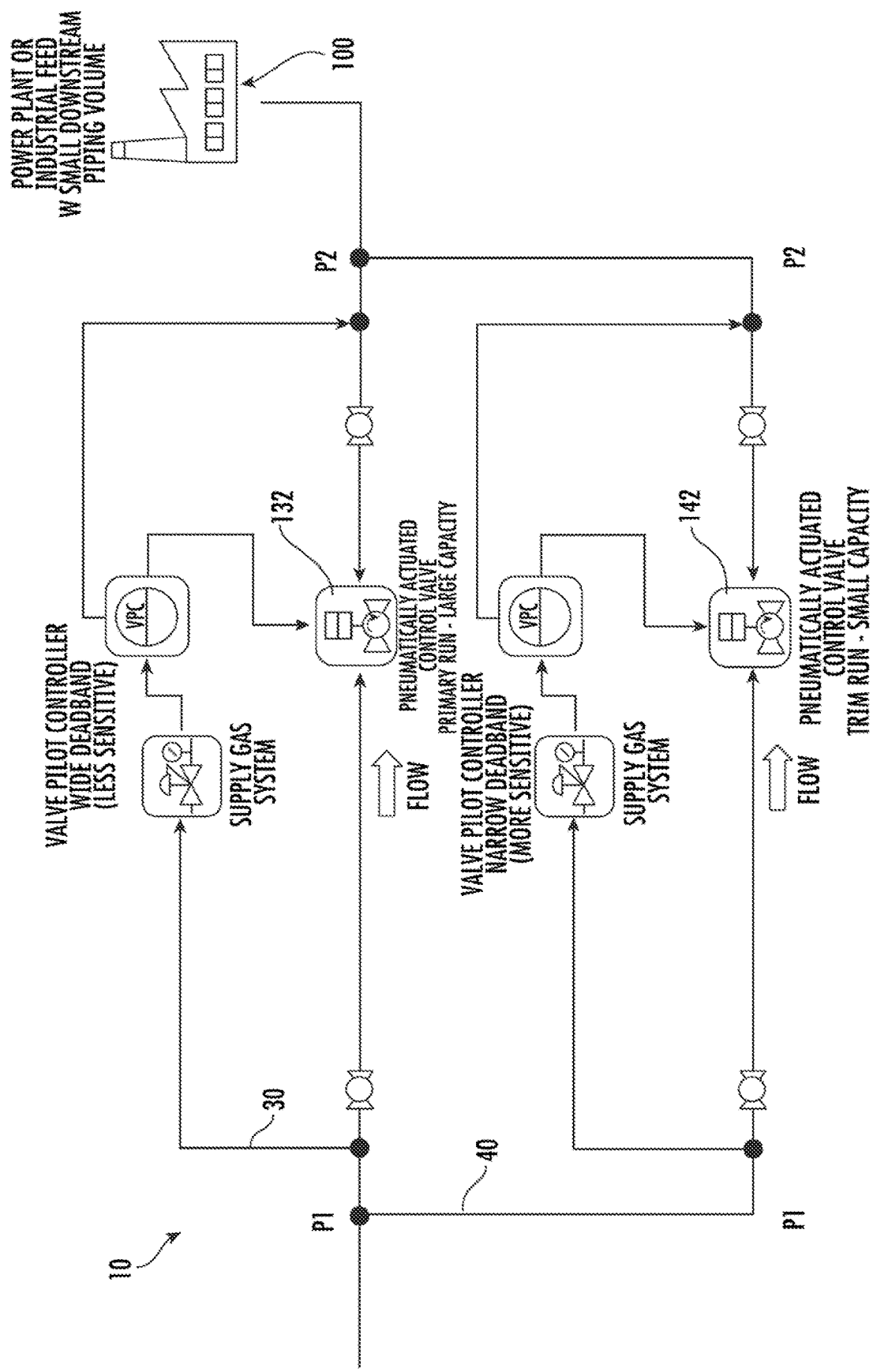
FIG. 2 is a schematic illustrating an alternate embodiment of the disclosed system using rotary control valves for controlling gas flow to a facility.

As shown in FIG. 2, pneumatically actuated rotary control valves 132 and 142 are used in place of the pneumatically actuated rotary linear control valves, 32 and 42. The control system 10 may also be designed using pneumatic positioners (not shown) or electric actuators (not shown). The system allows for use of whichever type of control valve is most suitable for the particular application, regardless of linear or rotary type, and shall be selected by those "skilled in the art."

Figure 3:
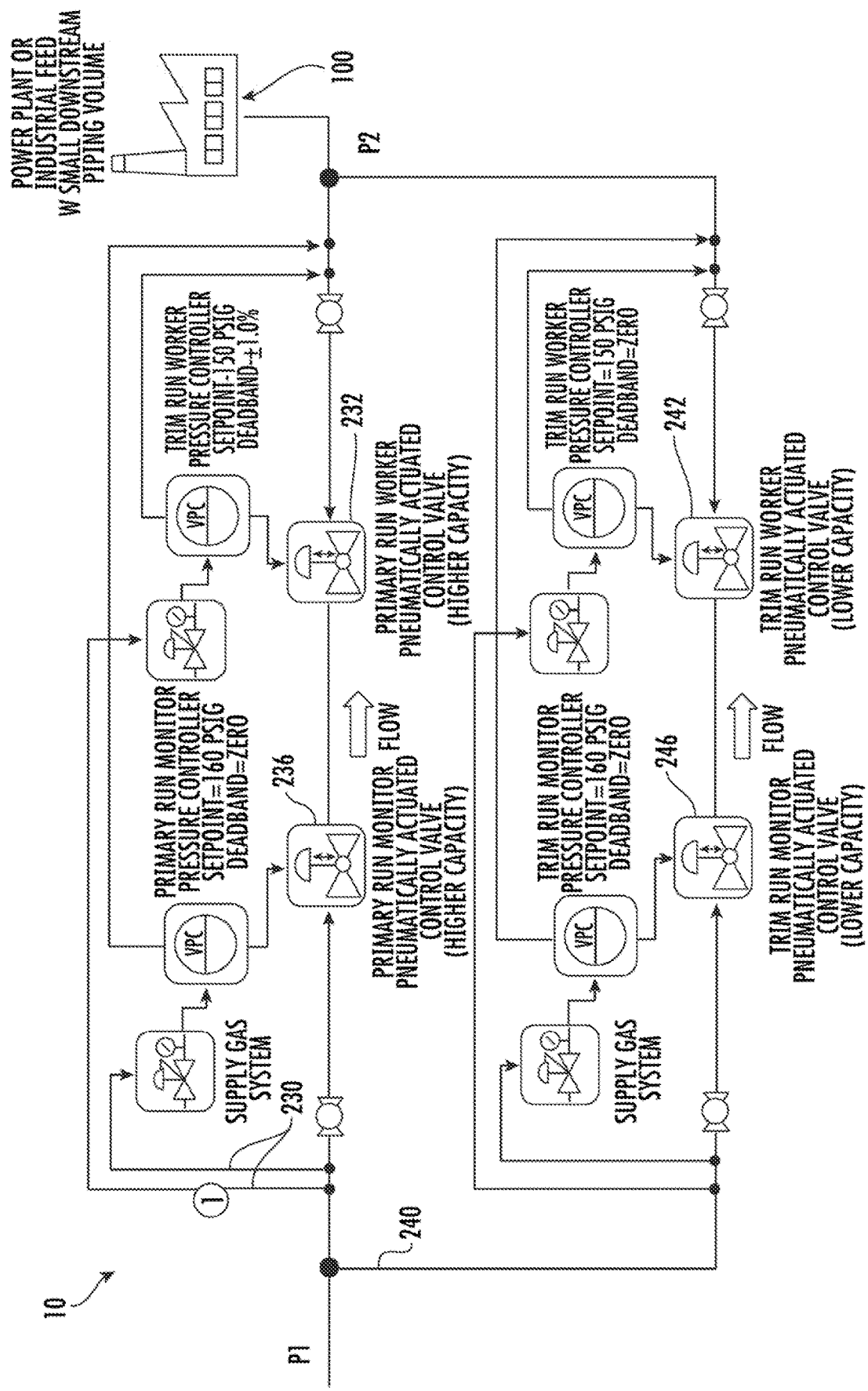
FIG. 3 is a schematic illustrating an alternate embodiment of the disclosed system using a monitor control valve and worker control valve arrangement in both the primary and trim runs of the delivery system.

FIG. 3 illustrates use of a monitor control valve, employed by the Assignee of this invention, VRG Controls, LLC., for many years as a way of providing "over-pressure" protection in a natural gas pipeline. During normal gas flow, P2 is less than P1 due to pressure reduction maintained by a worker regulator 242 in the trim run 240 and worker regulator 232 in the primary run 230. A monitor regulator 246 positioned upstream of the worker regulator 242 is in standby mode during normal operation. Similarly, a monitor regulator 236 is also used in combination with a worker regulator 232 in the primary run 230. However, the monitor regulator 246, and/or 236, takes over to throttle gas flow when the downstream pressure at P2 begins to exceed 160 psig. The onset of such an over-pressure condition is often due to a failure of the worker regulator 232 or 242. Otherwise, the operation of this embodiment as to gas delivery using a bracketed deadband control is identical to the embodiments of FIGS. 1 and 2, as described below.

With further reference to FIGS. 1-3, the actual gas supply flow into the facility 100 is measured as $F_X$ and may be referenced in this disclosure as "actual flow" of system 10. The two runs, 30 and 40, have a combined flow capacity ($C_X$) to the facility, but are designed to have different flow capacities, or $C_P$ and $C_T$, respectively. A key factor is the capacity ratio ($C_T:C_P$) between the control valves selected for the trim run 40 and the primary run 30. The valve of the primary run 30 will always have higher capacity than the trim run valve 40.

The actual flow for the primary run 30 is designated $F_P$ and for the trim run 40 it is designated $F_T$. Accordingly, the following equations arise:

$$C_X = C_P + C_T \text{ Gas Flow Capacity of System} \quad (1)$$

$$F_X = F_P + F_T \text{ Actual Gas Flow of System to Facility} \quad (2)$$

It is critical to the proper operation of the control system 10 that the control valve 32 and control valve 42 be selected to provide an ideal ratio of capacities ($C_T/C_P$) to achieve optimum results, as will be understood by those of skill in the art based on the description of various operating conditions below. Once selected, the capacities $C_P$ and $C_T$ do not change, which means $C_X$ also does not change. Of course, for obvious reasons $C_X$ must also be greater than the peak demand of the facility.

Figure 4:
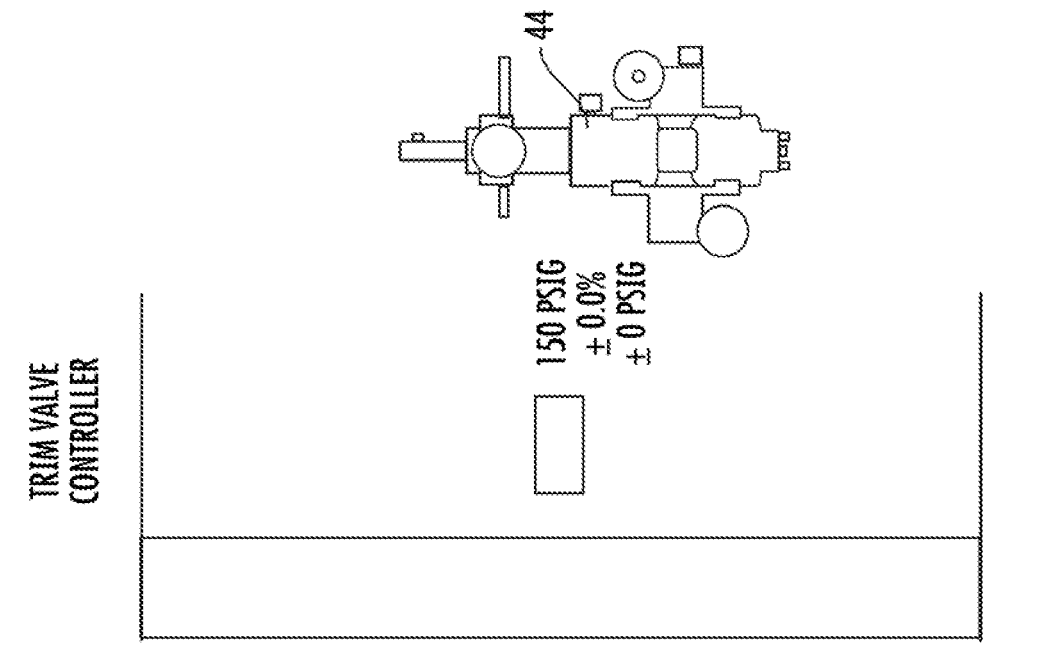
FIG. 4 is a schematic illustrating a bracketed deadband for each of two controllers for the system of FIG. 1.
Figure 4:
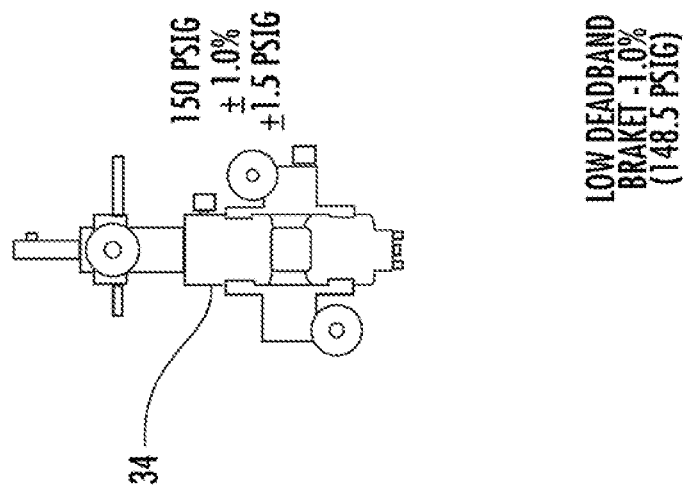

Referring to FIG. 4, embodiments of the two controllers are illustrated. The controller 34 of the primary run 30 has a setpoint of 150 psig with a bracketed deadband of ±1.0% (±1.5 psig). This means the controller 34 will operate to open control valve 32 when P2 reaches 148.5 psig as downstream pressure drops and closes control valve 32 when P2 reaches 151.5 psig as downstream pressure rises. The bracketed deadband may be made higher or lower, depending on the application and other factors. The controller 44 of the trim run 40 also has a 150 psig setpoint, but the deadband is set to zero (i.e., maximum sensitivity). Accordingly, control valve 42 is being continuously adjusted as controller 44 works to maintain P2 at 150 psig.

The operational relationship between the primary run 30 and trim run 40 can be more readily understood by looking at fluctuating gas supply demand conditions.

Figure 5A:
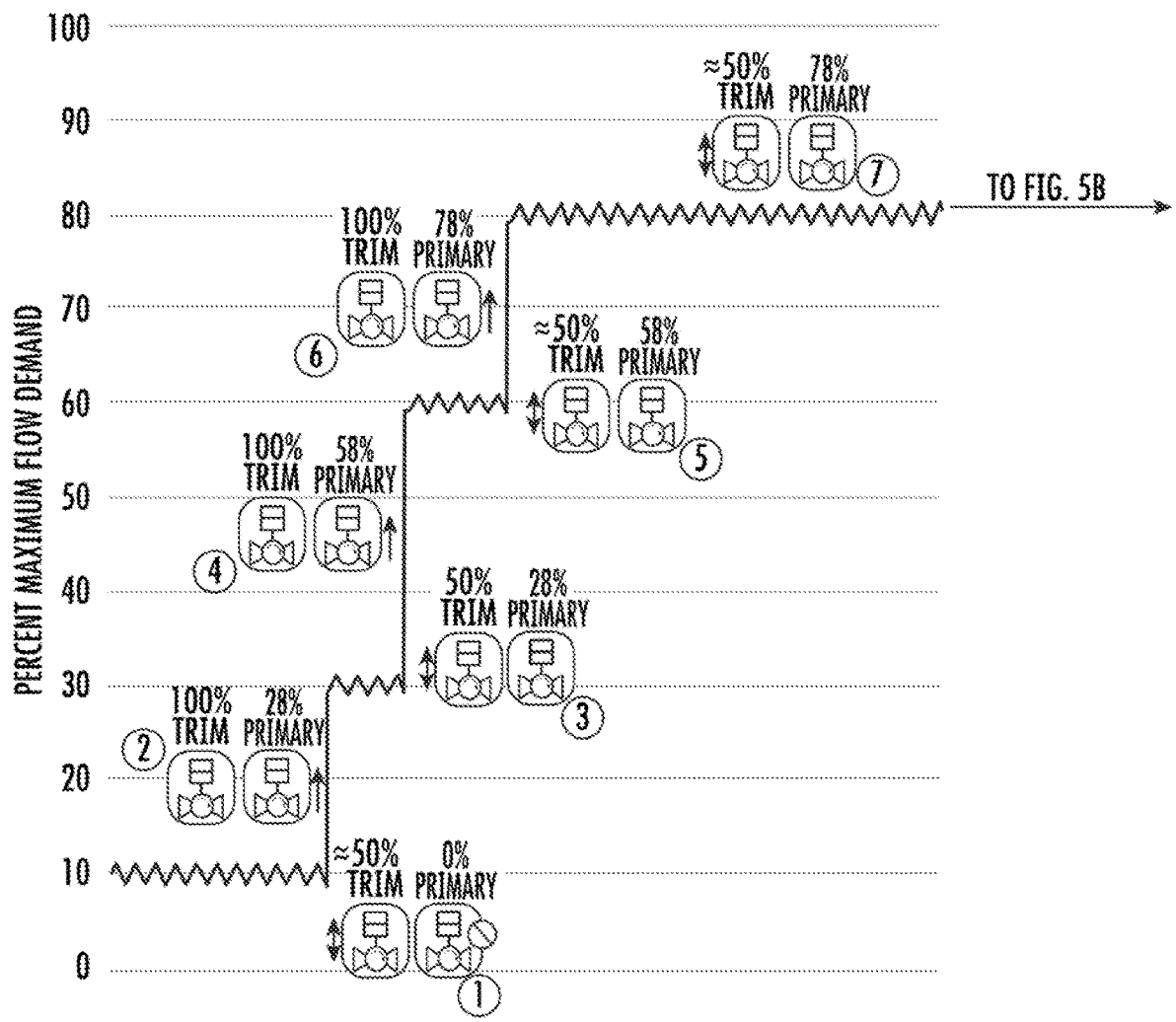
FIG. 5A is a schematic illustrating valve status for each gas line (i.e., run) in response to different rising and stable flow conditions of a hypothetical facility.
Figure 5B:
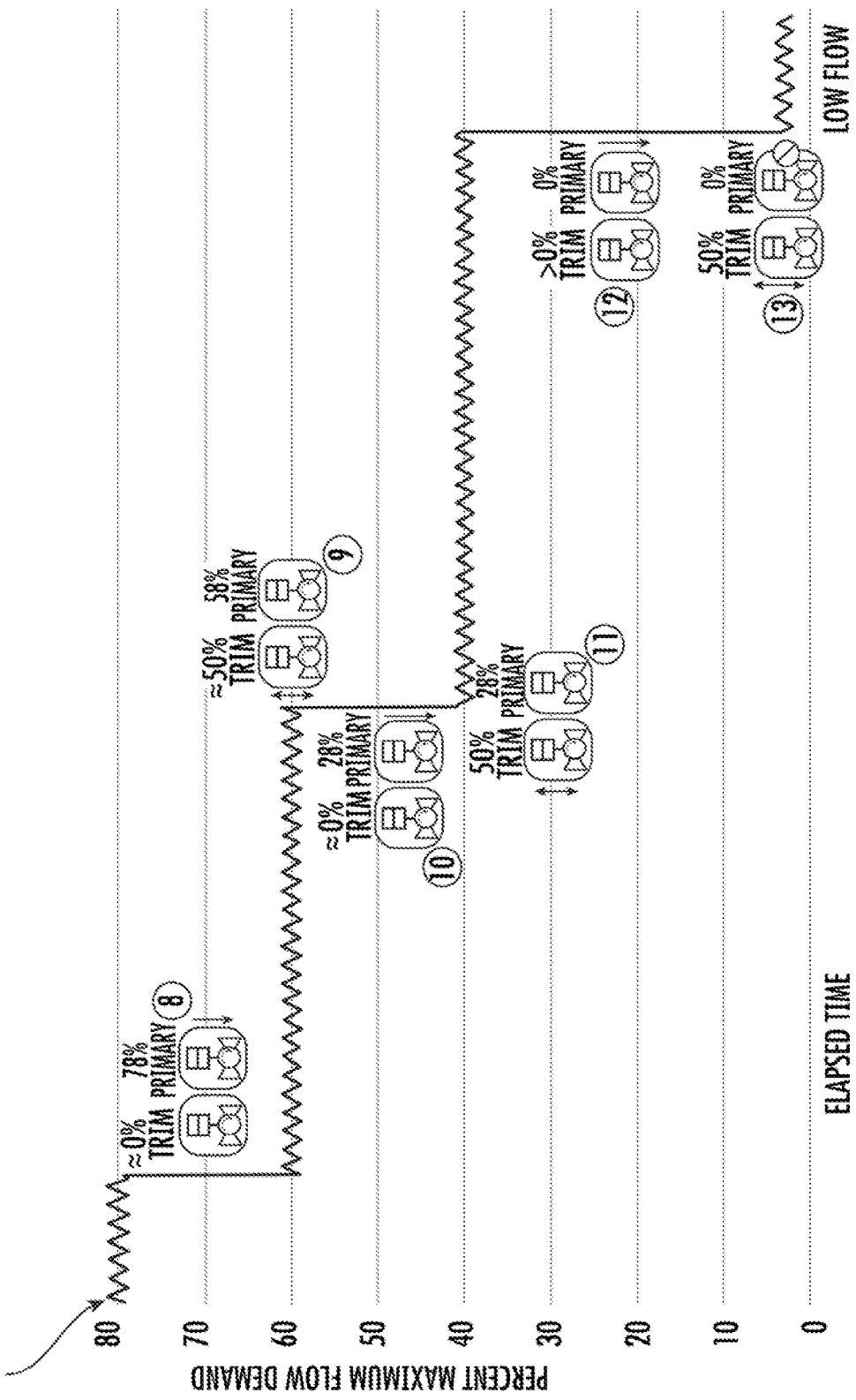
FIG. 5B is a schematic illustrating valve status for each gas line (i.e., run) in response to different falling and stable flow conditions of a hypothetical facility.

With reference to FIGS. 5A and 5B, a series of changing flow demands are set forth as a way of illustrating how the disclosed control system 10 operates as a whole, and the operational relationship between the primary run 30 and the trim run 40. For sake of clarity, the control system 10 in the following thirteen scenarios shall utilize a nominal downstream setpoint (P2) of 150 psig. In the following thirteen (13) scenarios, the gas flow demand by the facility is considered to be either stable, increasing, or decreasing.

In scenario (1) of FIG. 5A there is a stable low flow condition—e.g., approximately 10 percent of maximum flow demand. As illustrated, the trim run control valve 42 will accommodate the entire capacity of actual flow (i.e., $F_X = F_T$) while the primary run control valve 32 remains closed (i.e., $F_P = 0$). The trim run 40 is adjusted with zero deadband and continually adjusts position to maintain high accuracy of downstream pressure at 150 psig.

Moving to scenario (2) of FIG. 5A, a large flow volume increase is illustrated. Flow volume increases beyond the capacity of the trim run control valve 42. The control valve 42 opens rapidly to accommodate the increase in flow. When the control valve 42 reaches a full-open position (100%), downstream pressure (P2) will drop due to a restriction of the flow—i.e., actual flow is less than demand at the facility. When the downstream pressure (P2) falls to a low deadband bracket (i.e., 148.5 psig) the control valve 32 of the primary run 30 will begin to open to supplement flow. As shown, control valve 32 is at 28% open when pressure stabilizes to a value between the deadband bracket of the pressure controller 34—i.e., between 148.5 psig and 151.5 psig.

Moving to scenario (3), the system is now stable at a higher flow volume, approximately 30% of maximum flow demand. As illustrated, the control valve 32 of the primary run is stable at 28% open. The control valve 42 of the trim run 40 reverts to a partial open position (e.g., 50% open) and modulates position to maintain a tight 150 psig downstream pressure (P2).

At scenario (4) there is another large flow volume increase. Much like scenario (2), flow volume demand exceeds the capacity of the control valve 42 of the trim run 40. The control valve 42, previously at 50% open, opens rapidly to accommodate the increase in flow. When the control valve 42 reaches full-open position (100%) the downstream pressure (P2) will drop due to the restriction of the flow. When P2 falls to the low deadband bracket (i.e., 148.5 psig) of the controller 34, the control valve 32 will begin to open further e.g., 58% open to supplement flow. Eventually pressure will stabilize again to a value between the deadband bracket (i.e., 148.5 psig to 151.5 psig).

A third stabilized condition occurs at scenario (5), but now at a higher flow volume than scenario (3). The control valve 32 of the primary run 30 stabilizes at 58% open, while the control valve 42 of the trim run 40 reverts to a partial open position (e.g., 50% open) and modulates position to maintain a tight 150 psig downstream pressure (P2). The control system 10 is now operating at 60% of maximum flow demand.

A third large volume flow increase occurs at scenario (6). Flow volume increases beyond the current flow capacity of the control valve 42 of the trim run 40 as currently supplemented by the control valve 32 (e.g., 58% open) of the primary run 30. As a result, the control valve 42 opens rapidly to accommodate the increase in flow. When the control valve 42 of the trim run 40 reaches full-open position (100%) downstream pressure (P2) will drop due to the restriction of the flow. When downstream pressure falls to low deadband bracket (i.e., 148.5 psig), the control valve 32 of the primary run 30 will begin to open further (e.g., 78% open) to supplement flow and pressure will stabilize to a value between the deadband bracket (148.5 psig to 151.5 psig).

Finally, flow demand stabilizes at 80% of maximum flow demand in scenario (7). The control valve 32 of the primary run 30 stabilizes at 78% open, while the control valve 42 of the trim run reverts to a partial open position (e.g., 50% open) and modulates position to maintain a tight 150 psig downstream pressure (P2).

In the above scenarios, the disclosed control system 10 is illustrated in FIG. 5A reacting to an increasing facility demand. In each large volume increase the control valve 42 of the trim run 40 reached maximum flow capacity (i.e., $F_T = C_T$) requiring supplemented flow from the control valve 32 of the primary run 30 ($F_X = C_T + F_P$). In the following scenarios of FIG. 5B, the control system 10 is illustrated operating when the facility demand is decreasing and stabilizing, beginning where FIG. 5A left off.

In scenario (8) of FIG. 5B, the state of operation of the control system 10 is at 80% of maximum flow demand from the facility 100. This has the control valve 42 of the trim run 40 at 50% open and the control valve 32 of the primary run at 78% open. As a large flow volume demand decrease is experienced by the facility, the control valve 42 of the trim run 40 closes rapidly to accommodate the decrease in flow. When the control valve 42 reaches full-closed position (0%), downstream pressure (P2) will continue to increase due to the control valve 32 of the primary run 30 being at 78% open. When P2 rises to the high deadband bracket pressure (151.5 psig) the control valve 32 of the primary run 30 will begin to close to reduce flow. Eventually the pressure will stabilize to a value between the deadband bracket of the controller 34 (i.e., 148.5 psig to 151.5 psig).

At scenario (9) the flow demand stabilizes at a lower flow volume (e.g., 60% of maximum flow demand). The control valve 32 of the primary run 30 stabilizes at 58% open. The control valve 42 of the trim run 40 reverts to a partially open position (e.g., 50% open) and modulates position to maintain a tight 150 psig downstream pressure.

A second large flow volume decrease is experienced at scenario (10). The control valve 42 of the trim run 40 closes rapidly to accommodate the decrease in flow. When the control valve 42 reaches the full-closed position (0%), P2 will continue to increase due to the open position of the control valve 32 of the primary run 30. If downstream pressure reaches the high deadband bracket (151.5 psig) of the controller 34 of the primary run 30, then the control valve 32 will begin to close to reduce flow. Eventually the pressure stabilizes to a value between the deadband bracket (i.e., 148.5 psig to 151.5 psig).

Scenario (11) illustrates a stabilized flow ($F_X$) at 40% of the maximum flow demand. The control valve 32 of the primary run 30 stabilizes at 28% open, while the control valve 42 of the trim run 40 reverts to a partially open position (e.g., 50% open) and modulates position to maintain a tight 150 psig downstream pressure.

One more large flow volume decrease is illustrated at scenario (12). The control valve 42 of the trim run 40 closes rapidly to accommodate the decrease in flow. When the control valve 42 reaches a full-closed position (0%), downstream pressure (P2) will continue to increase due to open position of the control valve 32 of the primary run 30. When downstream pressure (P2) rises to the high deadband bracket pressure (151.5 psig), the control valve 32 of the primary run 30 will begin to close to reduce flow. Pressure will then stabilize to a value between the deadband bracket of the controller 34 of the primary run 30 (i.e., 148.5 psig to 151.5 psig).

Finally, the actual flow ($F_X$) of the control system 10 is again at a stabilized low flow volume (i.e., $F_X < C_T$). Accordingly, the control valve 32 of the primary run 30 moves to a full closed position ($F_P = 0$ and $F_X = F_T$). The control valve 42 of the trim run 40 reverts to a partial open position (e.g., 50% open) and modulates position to maintain a tight 150 psig downstream pressure (P2).

The thirteen scenarios described above with reference to FIGS. 5A and 5B are merely exemplary of the operation of the disclosed control system 10. The percentage numbers used are not intended to be limiting in any way, as the actual percentages of valve positions, actual flow, and demand will vary based on factors understood by those of skill in the art.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for controlling gas supply to a facility through a gas supply line having a primary run and a trim run, wherein total flow capacity through the primary run and trim run to the facility is defined by $C_X$, which is the total flow capacity of the primary run ($C_P$) plus the total flow capacity of the trim run ($C_T$), and an actual gas flow to the facility is defined by $F_X$, which is the actual flow of the primary run ($F_P$) plus the actual flow of the trim run ($F_T$) and wherein $F_X$ is less than $C_X$, $C_T$ is less than $C_P$ and $F_X$ is either stable, increasing, or decreasing based on a demand from the facility, the method comprising:

supplying gas to the facility wherein $F_X=F_T$ when $F_X$ is less than or equal to $C_T$;

supplying gas to the facility wherein $F_X=F_P+C_T$ when $F_X$ is increasing and greater than $C_T$;

supplying gas to the facility wherein $F_X=F_P+F_T$ when $F_X$ is stable and greater than $C_T$; and supplying gas to the facility wherein $F_X=F_P$ when $F_X$ is decreasing and greater than $C_T$.

2. The method for controlling gas supply to a facility as in claim 1, wherein supplying gas to the facility when $F_X$ is less than or equal to $C_T$ comprises adjusting a pneumatic control valve in the trim run.

3. The method for controlling gas supply to a facility as in claim 1, wherein supplying gas to the facility wherein $F_X=F_P+C_T$ when $F_X$ is increasing and greater than $C_T$ comprises adjusting a pneumatic control valve in the primary run.

4. The method for controlling gas supply to a facility as in claim 2, wherein supplying gas to the facility wherein $F_X=F_P+C_T$ when $F_X$ is increasing and greater than $C_T$ comprises adjusting a pneumatic control valve in the primary run.

5. The method for controlling gas supply to a facility as in claim 2, further comprising setting a pressure deadband at zero for a controller coupled to the pneumatic control valve in the trim run.

6. The method for controlling gas supply to a facility as in claim 3, further comprising setting a pressure deadband at greater than zero for a controller coupled to the pneumatic control valve in the primary run.

7. The method for controlling gas supply to a facility as in claim 4, further comprising setting a pressure deadband at greater than zero for a controller coupled to the pneumatic control valve in the primary run.

8. The method for controlling gas supply to a facility as in claim 1, wherein the trim run comprises:

an inlet coupled to a main gas supply line;

a low-capacity control valve positioned downstream of the inlet;

a pneumatic pressure controller having variable deadband adjustment; and an outlet feeding into a main gas supply line to the facility.

9. The method for controlling gas supply to a facility as in claim 8, wherein the primary run comprises:

a primary inlet coupled to a main gas supply line;

a high-capacity control valve positioned downstream of the primary inlet;

a primary pneumatic pressure controller having variable deadband adjustment; and a primary outlet feeding into a main gas supply line to the facility.

10. A system for controlling gas supply to a facility, the system comprising:

a primary run comprising:

a primary inlet branching from a main gas supply line;

a high-capacity pneumatic control valve positioned downstream of the primary inlet;

a primary pneumatic pressure controller having a pressure setpoint and variable deadband adjustment; and a primary outlet feeding into a gas supply line to the facility, a trim run comprising:

an inlet branching from the main gas supply line;

a low-capacity pneumatic control valve positioned downstream of the inlet;

a pneumatic pressure controller having a setpoint and variable deadband adjustment; and an outlet feeding into a main gas supply line to the facility;

wherein total flow capacity through the primary run and trim run to the facility is defined by $C_X$, which is the total flow capacity of the primary run ($C_P$) plus the total flow capacity of the trim run ($C_T$), and an actual gas flow to the facility is defined by $F_X$, which is the actual flow of the primary run ($F_P$) plus the actual flow of the trim run ($F_T$) and wherein $F_X$ is less than $C_X$, $C_T$ is less than $C_P$ and $F_X$ is either stable, increasing, or decreasing based on a demand from the facility; and wherein the primary pneumatic pressure controller and the trim pneumatic pressure controller have the same setpoint, and the primary pneumatic pressure controller has a bracketed deadband of ±1.0% of the setpoint.

11. The system of claim 10, wherein the trim pneumatic pressure controller is configured to supply 100% of gas to the facility when $F_X$ is less than or equal to $C_T$.

12. The system of claim 10, wherein the primary pneumatic pressure controller and the trim pneumatic pressure controller are configured to collectively supply 100% of gas to the facility at $F_X=F_P+C_T$ when $F_X$ is increasing and greater than $C_T$.

13. The system of claim 10, wherein the primary pneumatic pressure controller and the trim pneumatic pressure controller are configured to collectively supply 100% of gas to the facility at $F_X=F_P+F_T$ when $F_X$ is stable and greater than $C_T$.

14. The system of claim 10, wherein the primary pneumatic pressure controller is configured to supply 100% of gas to the facility when $F_X$ is decreasing and greater than $C_T$.

15. The system of claim 10, wherein the primary run further comprises:

a monitor control valve having an inlet, an outlet, and a mechanism for moving within a range between and including a fully open position and a fully closed position to control gas flow in the gas supply line, wherein gas flows from upstream to the inlet, to downstream through the outlet;

a first sensor for determining a flow pressure upstream of the monitor control valve inlet;

a second sensor for determining a flow pressure downstream of the monitor control valve outlet;
an adjustable valve responsive to the first sensor and coupled to the monitor control valve;
wherein the adjustable valve:
   closes the monitor control valve mechanism to prevent reverse gas flow when the first sensor determines an upstream pressure below a first predetermined value, and
   throttles the monitor control valve mechanism to regulate gas flow when the second sensor determines a downstream pressure above a second predetermined value.

16. The system of claim 10, wherein the trim run further comprises:
   a monitor control valve having an inlet, an outlet, and a mechanism for moving within a range between and including a fully open position and a fully closed position to control gas flow in the gas supply line, wherein gas flows from upstream to the inlet, to downstream through the outlet;
   a first sensor for determining a flow pressure upstream of the monitor control valve inlet;
   a second sensor for determining a flow pressure downstream of the monitor control valve outlet;
   an adjustable valve responsive to the first sensor and coupled to the monitor control valve;
   wherein the adjustable valve:
      closes the monitor control valve mechanism to prevent reverse gas flow when the first sensor determines an upstream pressure below a first predetermined value, and
      throttles the monitor control valve mechanism to regulate gas flow when the second sensor determines a downstream pressure above a second predetermined value.

17. A system for controlling supply gas to a facility comprising:
   a primary supply system comprising:
      a primary inlet
      a high-capacity pneumatically actuated control valve;
      a primary pneumatic pressure controller having variable deadband adjustment
      a primary outlet
   a secondary control supply system comprising:
      a secondary inlet
      a low-capacity pneumatically actuated control valve;
      a secondary pneumatic pressure controller having variable deadband adjustment
      a secondary outlet
   wherein the variable deadband adjustment of the primary pneumatic pressure controller is set at a higher percentage of the target pressure than the variable deadband adjustment of the trim pneumatic pressure controller;
   wherein total flow capacity through the primary run and trim run to the facility is defined by $C_X$, which is the total flow capacity of the primary run ($C_P$) plus the total flow capacity of the trim run ($C_T$), and an actual gas flow to the facility is defined by $F_X$, which is the actual flow of the primary run ($F_P$) plus the actual flow of the trim run ($F_T$) and wherein $F_X$ is less than $C_X$, $C_T$ is less than $C_P$ and $F_X$ is either stable, increasing, or decreasing based on a demand from the facility; and
   wherein the system operates in the following manner:
      supply gas to the facility at $F_X=F_T$ when $F_X$ is less than or equal to $C_T$;
      supply gas to the facility at $F_X=F_P+C_T$ when $F_X$ is increasing and greater than $C_T$;
      supply gas to the facility at $F_X=F_P+F_T$ when $F_X$ is stable and greater than $C_T$; and
      supply gas to the facility at $F_X=F_P$ when $F_X$ is decreasing and greater than $C_T$.

* * * * *